United States Patent [19]

Weghaupt et al.

[11] 4,323,801
[45] Apr. 6, 1982

[54] BEARING SYSTEM FOR A ROTOR OF ELECTRIC MACHINES, ESPECIALLY FOR A ROTOR OF A TURBOGENERATOR WITH A SUPERCONDUCTIVE FIELD WINDING

[75] Inventors: Erich Weghaupt; Reinhold D'ham, both of Mulheim an der Ruhr, Fed. Rep. of Germany

[73] Assignee: Kraftwerk Union Aktiengesellschaft, Mulheim an der Ruhr, Fed. Rep. of Germany

[21] Appl. No.: 147,153

[22] Filed: May 6, 1980

[30] Foreign Application Priority Data

May 9, 1979 [DE] Fed. Rep. of Germany ....... 2918763

[51] Int. Cl.³ .............................................. H02K 9/00
[52] U.S. Cl. ........................................ 310/52; 310/90
[58] Field of Search ...................... 310/10, 40, 52, 54, 310/90

[56] References Cited

U.S. PATENT DOCUMENTS

| | | | |
|---|---|---|---|
| 3,657,580 | 4/1972 | Doyle | 310/10 X |
| 3,673,444 | 6/1972 | Kawabe et al. | 310/10 |
| 3,942,053 | 3/1976 | Abolins et al. | 310/10 X |
| 4,060,743 | 11/1977 | Weghaupt | 310/10 X |

FOREIGN PATENT DOCUMENTS 552907  6/1974  Switzerland .

Primary Examiner—Donovan F. Duggan
Attorney, Agent, or Firm—Herbert L. Lerner; Laurence A. Greenberg

[57] ABSTRACT

Bearing system for a rotor of an electric machine having an outer rotor part formed as a hollow cylinder and an inner rotor part disposed therewithin, the rotor having a drive side and an exciter side at opposite ends thereof, the inner rotor part being operatable in cryogenic temperature range and being fastened thermally insulatingly with respect to the outer rotor part, which is warmer relative to the inner rotor part, the inner rotor part being firmly flanged to the outer rotor part at the exciter side, the outer and the inner rotor parts having separate outer and inner coaxial shaft shanks supported so as to be movable thermally in axial direction independently of one another, an expansion compensator being disposed between the outer and the inner coaxial shaft shanks and serving also for sealing from the outside a hollow space formed between the inner and the outer rotor part, includes first and second separate shaft bearings with respective bearing boxes associated with the outer and inner shaft shanks, respectively, the shaft bearings being axially spaced from one another, the first shaft bearing being adjustable during operation independently of the second shaft bearing for influencing vibration behavior of the rotor.

8 Claims, 5 Drawing Figures

BEARING SYSTEM FOR A ROTOR OF ELECTRIC MACHINES, ESPECIALLY FOR A ROTOR OF A TURBOGENERATOR WITH A SUPERCONDUCTIVE FIELD WINDING

The invention relates to a bearing system for rotors of electric machines, and more particularly, for a rotor of a turbogenerator with a superconductive field winding, wherein the rotor has an outer rotor part formed as a hollow cylinder and an inner rotor part disposed therewithin, the rotor having a drive side and an exciter side at opposite ends thereof, the inner rotor part being operatable in cryogenic temperature range, and being fastened thermally insulatingly with respect to the outer rotor part, which is warmer relative to the inner rotor part, the inner rotor part being firmly flanged to the outer rotor part at the exciter side, the outer and the inner rotor parts having separate outer and inner coaxial shaft shanks supported so as to be movable thermally in axial direction independently of one another, an expansion compensator being disposed between the outer and the inner coaxial shaft shanks and serving also for sealing from the outside a hollow space formed between the inner and the outer rotor part.

Such a bearing system is known from Swiss Pat. No. 552 907 wherein a common bearing box is provided on the exciter side for bearing journals and bearing shanks of the two rotor parts. In particular, the two bearing journals have the same outer diameter. While this results in a very compact disposition of the bearings, the dual bearing must be disassembled for inspection and maintenance of the expansion compensator. This heretofore known bearing system also has disadvantages in other respects, as the following considerations will show. A superconductive rotor has a field winding, for example, of niobium-titanium superconductors, which is fastened with the greatest precision free of play. The turns of the coils of the field winding are formed of individual wires which are combined to form Roebel bands or bars i.e. transposed bars. Such a winding is very sensitive and places increased requirements on the slot mounting and on avoiding excessively high shaft vibrations. It is therefore essential that the rotor carrying the superconductive winding run quietly if an adverse effect on the winding support and, in an extreme case, a quench (sudden transition from superconduction to normal conduction) is to be avoided.

The invention starts out from a consideration that, in the heretofore known dual bearing with a bearing box common to both bearing shanks, it is not possible to influence the running behaviors, or to influence it only to a limited extent, and seeks, as its object, to remedy the situation.

It is a further object of the invention to provide such a bearing system with improved accessibility of the expansion compensator so that it is unnecessary to disassemble the bearing in order to inspect the expansion compensator.

With the foregoing and other objects in view, there is provided, in accordance with the invention, a bearing system for a rotor of an electric machine having an outer rotor part formed as a hollow cylinder and an inner rotor part disposed therewithin, the rotor having a drive side and an exciter side at opposite ends thereof, the inner rotor part being operatable in cryogenic temperature range and being fastened thermally insulatingly with respect to the outer rotor part, which is warmer ralative to the inner rotor part, the inner rotor part being firmly flanged to the outer rotor part at the exciter side, the outer and the inner rotor parts having separate outer and inner coaxial shaft shanks supported so as to be movable thermally in axial direction independently of one another, an expansion compensator being disposed between the outer and the inner coaxial shaft shanks and serving also for sealing from the outside a hollow space formed between the inner and the outer rotor part, comprising first and second separate shaft bearings with respective bearing boxes associated with the outer and inner shaft shanks, respectively, the shaft bearings being axially spaced from one another, the first shaft bearing being adjustable during operation independently of the second shaft bearing for influencing vibration behaviors of the rotor.

By the adjustability of the hollow-shaft bearing on the exciter side, there is understood to mean herein in the following that, especially in a three-bearing rotor wherein one bearing is located at the turbine or drive side end (TS) and the separate first and second shaft bearings provided according to the invention are located at the shaft end on the exciter side (ES), the position of the hollow-shaft bearing on the exciter side (first shaft bearing) and the spring stiffness thereof can be varied in any desired direction of the radial plane (normal to the axis), within given limits, without appreciably disturbing the alignment of the shaft assembly at the TS and ES coupling planes. In particular, the hollow-shaft bearing is constructed so that (a) adjustment of the alignment of the bearing in any direction of the radial plane is possible also during operation, and (b) the bearing elasticity is variable also during operation in at least two directions (preferably the vertical and the horizontal direction) within wide limits.

A special advantage resulting from such adjustability is that the change of the bearing stiffness of the hollow-shaft bearing influences the vibration behavior not only of the outer rotor part (outer hollow-drum rotor), but also causes a reaction on the inner rotor part carrying the superconducting field winding. The inner rotor part and the outer rotor part namely form a coupled vibration or oscillating system, the characteristic modes of which can be changed considerably by varying the spring-elasticity or resilience of the hollow-shaft bearing. The amplitudes of the forced vibration also change with the change of the characteristic modes, for a given unbalance distribution. An optimum can be set in this manner.

In accordance with another feature of the invention, the first and second shaft bearings are centerable independently of one another with respect to the shaft axis and at least the first shaft bearing for the hollow outer rotor part having spring-elastic or resilient means for varying the bearing stiffness thereof. As is well known, an axially symmetrical structure, be it a shaft or a housing, can be centered with respect to a fictitious centering axis if it has at least three adjustable force-application points, as seen along the circumference thereof, which must be distributed over a circumferential or peripheral angle of more than 180°. Thus, appropriate adjustment points can be provided in three axial planes each of which form, for example, an angle of 120° with respect to one another, the force of the spring members also being located at these three adjustment points.

In accordance with a further feature of the invention, the two diametrically opposite, adjustable force-application points are provided on the bearing boxes, respectively, in vertical and horizontal axial planes of the first shaft bearing for the hollow outer rotor part so that the bearing block is adjustable in elevation and laterally with respect to a bearing housing common to both the first and second shaft bearings in all four coordinate directions, and including respective spring members disposed at the bearing housing in vicinity of the force-application points, the respective mutually opposing spring-member pairs being constructed so as to be adjustable with respect to the resultant spring constant thereof.

The force-application points and the spring members are thereby disposed in two orthogonal axes, providing quadruple adjustability, namely, in the two horizontal and the two vertical directions. Adjustability of the resultant spring constant means especially that with the spring member pairs (f1, f2 and f3, f4), adjustable with respect to the resultant spring constant thereof, the spring stiffness of at least one spring member f1 and f3, respectively, is adjustable, and the spring member is provided with a progressive spring characteristic for this purpose. By controlling the resultant spring stiffness through pretensioning of the spring members in the vertical and horizontal direction, the bearing alasticity or resilience can be varied within wide limits.

In accordance with an added feature of the invention at least the lowermost of the spring members has a support which is hydraulically adjustably braced.

In accordance with yet another feature of the invention, the support includes a bearing stand formed with a wedge surface inclined toward the horizontal and disposed on a matching wedge surface formed on an underlying bearing seat, the bearing stand and the bearing seat constituting a wedge pair of which the upper bearing-stand wedge is radially movable yet fixed against axial movement and the lower bearing-seat wedge is mounted so as to axially movable, and including an hydraulic adjusting drive coupled to the lower bearing-seat wedge for axially moving the latter.

In accordance with yet a further feature of the invention, at least one of the spring members, respectively, of each of the mutually opposing spring-member pairs which are adjustable with respect to the resultant spring constant thereof is adjustable with regard to spring stiffness and accordingly has a progressive spring characteristic.

In accordance with yet an added feature of the invention, the at least one spring member is constructed as a multilayer leaf spring wherein, depending upon pretensioning thereof, either only the base spring layer having the longest legs is in contact thereby with an opposing surface or at least one of the other spring layers is also in contact by the legs thereof with an opposing surface.

In accordance with a concomitant feature of the invention, the adjustable spring members are constructed as buffer springs.

Other features which are considered as characteristic for the invention are set forth in the appended claims.

Although the invention is illustrated and described herein as embodied in a bearing system for a rotor of electric machines, especially for a rotor of a turbogenerator with a superconductive field winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a longitudinal sectional view of a buffer or volute spring, and in

Figure 1:
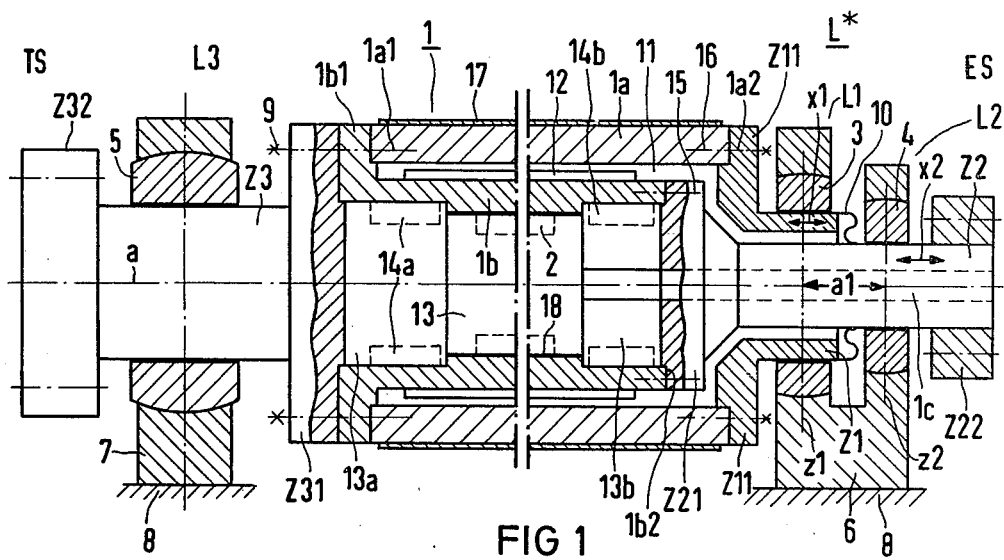
FIG. 1 is a longitudinal sectional view of a turbogenerator rotor with a superconductive field winding in a 3-bearing disposition.

Referring now to the drawing and first particularly, to FIG. 1 thereof, there is shown a 2-bearing system L* according to the invention on the right-hand side of the figure at the shaft end ES on the exciter side of the turbogenerator, which has a superconductive field winding 2. The rotor, as a whole, is supported by means of a 3-bearing system, wherein the 2-bearing system L* encompasses two journal bearings L1 (a first shaft bearing) and L2 (a second shaft bearing), and a third journal bearing L3 is provided for supporting the rotor at its shaft end TS with a shaft shank Z3 on the turbine or drive side thereof. The bearings L1, L2 and L3 have respective bearing boxes 3, 4 and 5 where, in the case of the bearings L1 and L2, a bearing housing 6 is common to the two bearing boxes 3 and 4, while the bearing box 5 of the bearing L3 is held in a bearing housing 7. The bearing housings 6 and 7 are supported on foundation planes 8. The rotor 1 having a shaft axis a represented by a dot-dash line is made up of an outer rotor part 1a in the form of a hollow cylinder and an inner rotor part 1b which accommodates the hereinaforementioned superconductive field winding 2. The inner rotor part 1b, which is operated in low-temperature range, is fastened, thermally insulated, on the outer rotor part 1a which is warmer than the inner rotor part and is firmly flanged to the latter on the drive side TS. To this end, the ring flange Z31 of the shaft shank Z3, the ring flange 1b1 of the inner rotor part 1b, and the annular mounting surface 1a1 of the outer rotor part 1a are clamped together firmly mechanically by means of clamping screws 9 into a rotor unit 1. On the exciter side ES, on the other hand, the outer and inner rotor parts 1a and 1b have separate outer and inner coaxial shaft shanks Z1 and Z2, respectively, which are axially movable thermally independently or one another, and between which an expansion compensator 10 is disposed which allows relative motion particularly in axial direction of the two shaft shanks Z1 and Z2 and, furthermore, serves for sealing the hollow space 11 located between the inner and the outer rotor parts 1a and 1b from the outside. The hollow space 11 is preferably a high-vacuum chamber which maintains the necessary temperature gradient from the low-temperature range of the inner rotor part 1b to the ambient temperature of the outer rotor part 1a. To aid or support this action, a radiation shield 12 is applied to the outer peripheral surface of the inner rotor part 1b. The radiation shield 12 shields the inner rotor part 1b largely against the heat radiation emanating from the inner peripheral surface of the outer rotor part 1a. Within the inner rotor part 1b, a winding support member 13 is held centered and is thermally shielded at both ends thereof from the shaft shank Z3 with the ring flange Z31 and from the shaft shank Z2 with the ring flange Z21 by means of high-vacuum chambers 13a and 13b and by means of counterflow coolers 14a and 14b. The inner rotor part 1b is clamped to the ring flange Z21 of the inner shaft shank Z2 at the ring mounting surface 1b2 thereof by means of clamping screws 15. The flange connection wetween the ring mounting surface 1a2 of the outer rotor part 1a and the ring flange Z11 of the outer shaft shank Z1 is affected by a further circle of clamping screws 16.

The superconductive winding 2 is supplied with coolant, such as liquid helium, especially, by means of coaxial feed and discharge shaft channels 1c represented by broken lines. Before the liquid helium, which is warmed up in the winding 2 (and has then become partly gaseous), leaves the region of the inner rotor part 1b, it is first conducted for cooling through counterflow coolers 14a, and 14b, preferably through non-illustrated helical cooling coils.

The shaft shank Z3 on the turbine side has a coupling flange Z32, and the inner shaft shank Z2 on the excite side ES, a coupling flange Z22. The helium-connecting head on the exciter side ES is not shown nor is the stator of the superconducting generator, since they are unnecessary for an understanding of the invention. It will merely be mentioned that an outer damping shield 17 is mounted at the outer peripheral surface of the outer rotor part 1a, and an inner damping shield 18 is mounted at the outer peripheral surface of the winding support 13.

When viewing FIG. 1, it is apparent that the shaft shanks Z1 and Z2 execute thermal movements in accordance with the arrows x1 and x2, which must be different during transient warming-up and cooling-down processes, since the outer rotor part 1a is at a substantially higher temperature level during operation than is the inner rotor part 1b. This relative axial motion occurs especially when the inner rotor part 1b is cooled relative to the outer rotor part 1a(starting-up and acceleration phase) and in the process of warming up the inner rotor part 1b relative to the outer rotor part 1a (shutting down). In addition, it is apparent that the rotor parts 1a and 1b form a vibration or oscillating system coupled in vicinity of the ring flanges 1a1 and 1b1. This coupled vibratory or oscillating system is supposed to be adjustable, according to the invention, not only at standstill but also in operation for the quietest possible running behavior. For this purpose (note FIG. 1 in conjunction with FIG. 2), a separate first shaft bearing L1 and a second shaft bearing L2 with a respective bearing box 3 and 4, are associated with the outer shaft shank Z1 and the inner shaft shank L2, and the two shaft bearings L1 and L2 are axially spaced from one another (note the distance a1 between the two bearing center planes z1 and z2 normal to the axis). Furthermore, the first bearing L1, which is associated with the outer shaft shank Z1 and could be called the hollowshaft bearing because the outer shaft shank Z1 is constructed as a hollow shaft, is adjustable independently of the second bearing L2 to influence the vibration behavior of the rotor.

Figure 2:
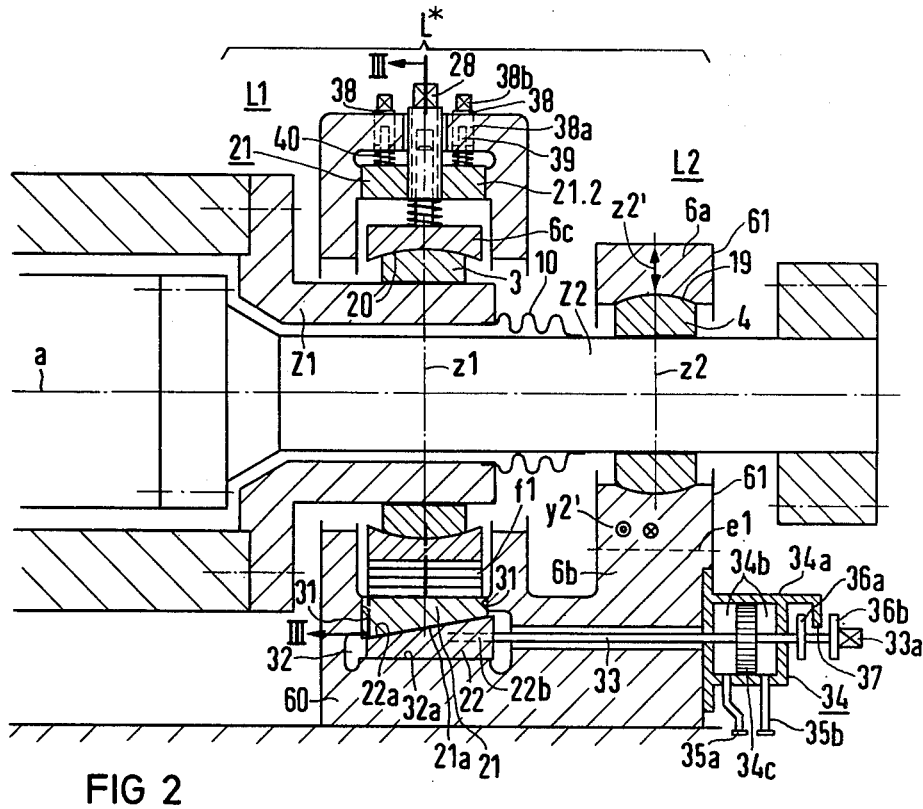
FIG. 2 is an enlarged fragmentary view of FIG. 1 showing the dual bearing system at the exciter side in greater detail.
Figure 3:
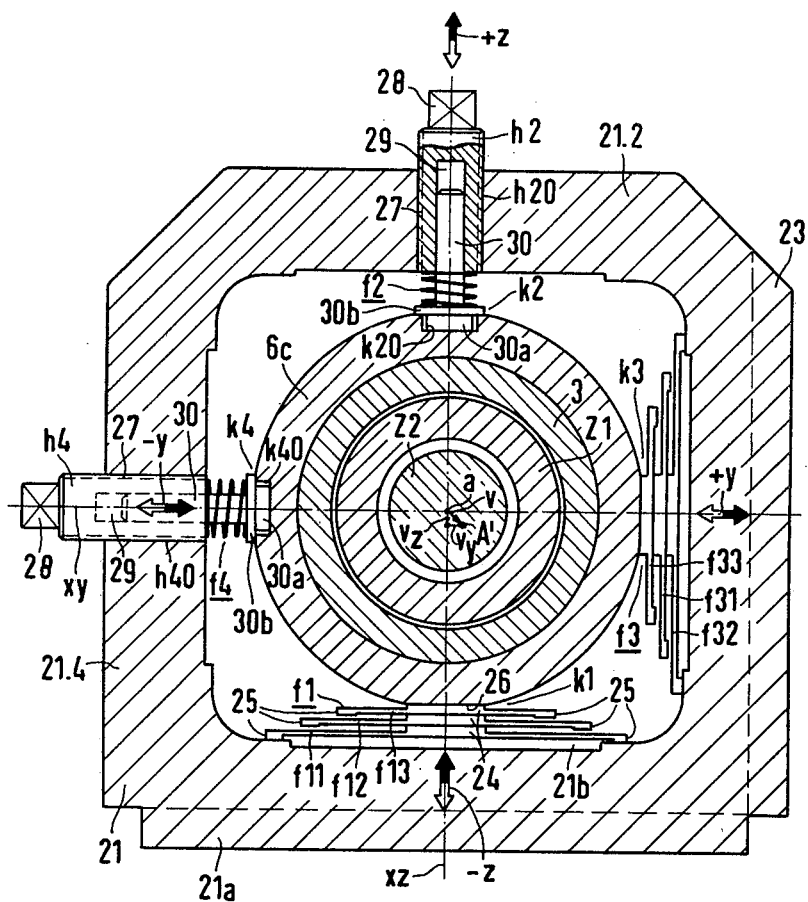
FIG. 3 is a cross-sectional view of FIG. 2 taken along the section line III-III in direction of the arrows, wherein the possibilities for adjustment in the two horizontal and the two vertical directions are indicated by double-leaded direction arrows.

FIGS. 2 and 3 show further details. In particular, the two shaft bearings L1 and L2 can be centered independently of one another with respect to the shaft axis a, only the centering means for the bearing L1 being shown and explained hereinafter; the shaft bearings L1 and L2 being of special construction and disposition because they are to be adjustable also in operation. For the bearing L2, centering means suffice which afford centering of the shaft shank Z2 with respect to the shaft axis line a during standstill. Such centering means are formed, for example, by the upper part 6a of the bearing housing 6 being guided so as to be adjustable relative to the lower part 6b in the slide plane e1 in the lateral direction according to the arrows y2', and is also adjustable in elevation by disposing suitable sliding wedges (not shown) in accordance with arrows z2'. After the adjustment, the upper part 6a is secured relative to the lower part 6b in a conventional manner. Besides a spherical adjustment in the form of spherical sliding surfaces 19 is possible between the bearing box 4 and the upper part 6a of the bearing housing 8. Corresponding spherical sliding surfaces 20 are also disposed between the bearing box 3 and the holding member 6c thereof. Hereinafter, the centering means and spring-elastic means for varying the bearing stiffness for the first bearing L1 will be discussed in detail (note FIG. 2 in conjunction with FIG. 3).

In the vertical axial plane xz and in the horizontal axial plane xy of the hollow-shaft bearing L1, two diametrically opposite, adjustable force-application points k1 (bottom), k2 (top), and K3 (right-hand) and k4 (left-hand), respectively, are provided in FIG. 3 at the bearing box 3 i.e. at the holding member 6c of the bearing box 3 in the illustrated case, and, indeed, in such a manner that the bearing box 3 is adjustable in height and laterally by the holding member 6c relative to the bearing housing part 60 (which simultaneously form a bearing pedestal) and relative to the shaft axis a in the four coordinate directions $+z$, $-z$, $+y$ and $-y$. In the interest of simplicity, only the frame-shaped stand 21 and the bearing parts disposed therewithin are shown in FIG. 3. This bearing stand 21 has lower wedge surfaces 21a, by means of which it rests on corresponding wedge-shaped opposing surfaces of a bearing support 22 (FIG. 2). In a corresponding manner, lateral wedge surfaces 23 of the bearing stand 21 are guided at nonillustrated lateral wedge opposing surfaces. The pair of wedge surfaces 21a and 22a serves for adjusting the bearing stand 21 vertically; the lateral wedge surface 23 with non-illustrated wedge opposing surfaces serves for horizontal or lateral adjustment.

The bearing box 3, the holding member 6c, the bearing stand 21 and the bearing housing 6 i.e. the two parts 60 and 61 thereof associated with the bearings L1 and L2, respectively, are advantageously all of two-shell construction with a parting gap disposed in the horizontal axial plane or parallel thereto with corresponding non-illustrated parting-gap flanges so that the rotor 1 with the shaft shanks Z1, Z2 and Z3 thereof can be assembled. In vicinity of the force-application points k1 to k4, spring members f1 to f4 are inserted between the holding member 6c and the bearing stand 21, the lower spring member f1 of which and the right-hand spring member f3, as shown in FIG. 3, are constructed so as to adjustable in stiffness. To this end, they have a progressive spring characteristic and are constructed as multilayer leaf springs. Thus, the spring member f1 is of three-layer construction with, starting from the lowest and longest layer f11, stepwise shorter layers f12 and f13, the individual layers being disposed mutually adjacent at reinforced central parts 24 thereof i.e. are stacked to form a packet, and have reinforced base or foot parts 25 at the ends thereof. The lowest layer f11 is braced by the reinforced base or foot parts of both ends thereof against the bearing stand 21, which will be described hereinafter in further detail with reference to FIG. 2. This bearing stand 21 is formed with a recess 21b so that the leaf spring f1 has sufficient room for yielding or flexing downwardly. The upper layer f13 of the leaf spring f1 engages by the reinforced central part 24 thereof with a corresponding flat surface 26 of the holding member 6c. Besides, the leaf spring f1 and similarly the leaf spring f3 are depicted so that the second and third layer f12, f13 and f32, f33, respectively, thereof are not yet in engagement by the feet 25 thereof with the adjacent layer; such engagement occurs only with a corresponding loading by the rotor body 1 and/or if the spring members F1 and, accordingly, f3 are pre-tensioned so that they are bent under the pre-tensioning so far that the bases or feet 25 of the respective middle layer f12 and f32 and, with even higher pre-tensioning or loading, also the bases or feet 25 of the respective uppermost layer f13 and f33, come into engagement. The adjustment of the resultant spring constant $c_{res}$ is then effected in accordance with the formula $$1/c_{res} = 1/c_1 + 1/c_2 \text{ (vertical) and}$$

$$1/c_{res} = 1/c_3 + 1/c_4 \text{ (horizontal)}$$

by means of the two setscrews h2 (top) and h4 (left-hand) which are screwed into the bearing stand 21.

FIG. 3 shows that the setscrews h2 and h4, provided with external threads h20 and h40, are screwed into corresponding tapped holes 27 formed in the bearing stand 21, the setscrew h2 being screwed centrally into the horizontal crosspiece or traverse 21.2 and the setscrew h4 centrally into the side wall 21.4. Both setscrews h2 and h4 have, at the outer end thereof, a respective square head 28 for gripping by conventional wrenches. Guide pins 30 with a pin head 30a are supported longitudinally movably in the ±z-direction and the ±y-direction, respectively, within a blind setscrew hole 29, while the pin heads 30a of the two pins 30 each engage in matching recesses k20 and k40 formed at the outer peripheral surface of the holding member 6c, and both pin heads 30a further have a spring plate or shoulder 30b, which may be formed therein or provided as a separate disc or washer. These spring plates 30b serve as support surfaces for the one end of respective compression coil springs f2 and f4 which are slipped over the shanks of the pins 30 and engage by the other end thereof against the lower or right-hand end face of the setscrews h2 and h4, respectively, as the second support or bearing surface.

If the setscrew h2 is screwed further into the bearing stand 21 in the −z direction, the compression coil spring f2 is further compressed. The larger spring force in the z-direction pre-tensions the leaf spring f1 more, the layers f12 and possibly f13 consequently coming into engagement in accordance with the progressive characteristic thereof, depending upon the extent of pretensioning. This means that the spring stiffness in the z-axis is increased and the resultant spring constant $c_{res}$ (see above) is changed. Similarly, the spring stiffness of the spring f3 and the resultant spring constant in the y-axis can be increased by screwing-in the setscrew h4 in the +y-direction. By these adjustment measures, the center of the shaft shank Z1 is generally displaced from the centered alignment line a of the shaft axis, and, indeed, for example, vertically by a distance $v_z$ and horizontally by distance $v_y$, whereby the resultant displacement by a distance v to the point A′ is obtained. The bearing L1 therefore must be recentered by a subsequent or simultaneous wedge-surface adjustment.

To clarify this, the wedge surface support 21, 22 will first be explained in greater detail, referring to FIG. 2.

The upper wedge surface 21a is part of the bearing stand 21, which is guided radially displaceably, but axially fixed in a corresponding recess 31 formed in the bearing housing part 60. The lower counterwedge 22 (bearing seat) is supported in a corresponding housing recess 32 formed in the bearing housing part 60 and is axially movable on a guide surface 32a and coupled hydraulically by means of a drive rod 33 to an hydraulic positioning drive 34. The latter has a working cylinder 34a with two pressure oil inlet nozzles 35a and 35b which terminate in a piston chamber 34b on both sides of a power piston 34c mounted on the drive rod 33. In the vicinity of the free outer end thereof, the drive rod 33 further has two fixed discs 36a and 36b axially spaced a distance from one another which, together with a stop 37 fixed to the housing, form a stroke limitation for the power piston 34c. The movement of the counterwedge 22 is adjustable in both directions of motion by screwing the drive rod 33 in or out, for which purpose there is a tapped hole 22b formed in the counterwedge 22, and a square end 33a provided at the outer end of the drive rod 33.

As an abutment for the wedge surface support 21, 22, adjustable clamping screw 38 with a square end 38b are provided which are screwed from the outside into the upper part of the bearing housing 60, the square ends 38b being formed with blind holes 38a in which guide pins 39 which are provided at the outer periphery of the bearing stand 21 are slidably guided in the z-direction; compression coil springs 40 which are braced, on the one hand, against the bearing stand 21 and, on the other hand, against the lower end face of the clamping screws 38, are slipped over the guide pins 39. By tightening the clamping screws 38, for example, by means of a torque wrench, uniform tensioning of the bearing stand 21 is attainable through tensioning of the coil springs 40. A corresponding bearing-stand tightening device with wedge-surface adjustment is associated with the side of the bearing stand 21 shown at the right-hand side of FIG. 3, but is not illustrated in detail.

The hereinaforementioned adjustment with respect to spring stiffness and bearing elasticity and with respect to the centered position of the shaft is first performed before the rotor 1 is set in operation. In an experimental or test installation, however, this adjustment can also be made during operation so as to adjust to the quietest running behavior. In this manner, experience data are arrived at which can be applied to subsequent rotors of similar construction. To adjust similar rotors accurately, it is sensible to retain the possibility of adjustment during operation. The once-adjusted spring stiffness and bearing elasticity are maintained in the centering operation by means of the wedge surfaces 21a, 22a and the lateral wedge surfaces, because only the bearing stand 21, as a whole, is moved.

Figure 4:
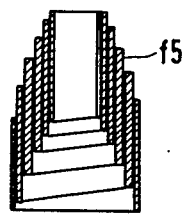
Figure 5:
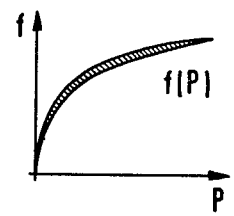
FIG. 5 is a plot diagram of the characteristic appertaining to the buffer spring according to FIG. 4.

FIG. 4 shows yet another advantageous embodiment of the spring members f1, f2, f3 and f4 in the form of a buffer spring f5 which is suitable, as is well known, for absorbing large spring forces with relatively small spring excursion and little space requirement. To avoid shocks, however, this buffer spring f5 must be so dimensioned that parts of the winding turns do not strike the abutment even when the greatest dynamic forces that can occur are present. FIG. 5 additionally shows the characteristic of such a buffer spring qualitatively, the height of the spring f (ordinate) being plotted against the spring load P (abscissa) and the characteristic f(P) showing the continuously increasing progression of the curve.

There are claimed:

1. Bearing system for a rotor of an electric machine having an outer rotor part formed as a hollow cylinder and an inner rotor part disposed therewithin, the rotor having a drive side and an exciter side at opposite ends thereof, the inner rotor part being operatable in cryogenic temperature range and being fastened thermally insulatingly with respect to the outer rotor part, which is warmer relative to the inner rotor part, the inner rotor part being firmly flanged to the outer rotor part at the exciter side, the outer and the inner rotor parts having separate outer and inner coaxial shaft shanks supported so as to be movable thermally in axial direction independently of one another, an expansion compensator being disposed between the outer and the inner coaxial shaft shanks and serving also for sealing from the outside a hollow space formed between the inner and the outer rotor part, comprising first and second separate shaft bearings with respective bearing boxes associated with the outer and inner shaft shanks, respectively, said shaft bearings being axially spaced from one another, said first shaft bearing being adjustable during operation independently of said second shaft bearing for influencing vibration behavior of the rotor.

2. Bearing system according to claim 1 wherein said first and second shaft bearings are centerable independently of one another with respect to the shaft axis and at least said first shaft bearing for said hollow outer rotor part having spring-elastic or resilient means for varying the bearing stiffness thereof.

3. Bearing system according to claim 2 wherein two diametrically opposite, adjustable force-application points are provided on said bearing boxes, respectively, in vertical and horizontal axial planes of said first shaft bearing for said hollow outer rotor part so that said bearing block is adjustable in elevation and laterally with respect to a bearing housing common to both said first and second shaft bearings in all four coordinate directions, and including respective spring members disposed at said bearing housing in vicinity of said force-application points, the respective mutually opposing spring-member pairs being constructed so as to be adjustable with respect to the resultant spring constant thereof.

4. Bearing system according to claim 3 wherein at least the lowermost of said spring members has a support which is hydraulically adjustably braced.

5. Bearing system according to claim 4 wherein said support includes a bearing stand formed with a wedge surface inclined toward the horizontal and disposed on a matching wedge surface formed on an underlying bearing seat, said bearing stand and said bearing seat constituting a wedge pair of which the upper bearing stand wedge is radially movable yet fixed against axial movement and the lower bearing-seat wedge is mounted so as to be axially movable, and including an hysraulic adjusting drive coupled to said lower bearing-seat wedge for axially moving the latter.

6. Bearing system according to claim 3 wherein at least one of the spring members, respectively, of each of said mutually opposing spring-member pairs which are adjustable with respect to the resultant spring constant thereof is adjustable with regard to spring stiffness and accordingly has a progressive spring characteristic.

7. Bearing system according to claim 6 wherein said at least one spring member is constructed as a multilayer leaf spring wherein, depending upon pretensioning thereof, either only the base spring layer having the longest legs is in contact thereby with an opposing surface or at least one of the other spring layers is also in contact by the legs thereof with an opposing aurface.

8. Bearing system according to claim 6 wherein said adjustable spring members are constructed as buffer springs.

* * * * *